US008446862B2

(12) United States Patent  (10) Patent No.: US 8,446,862 B2
Yokota  (45) Date of Patent: May 21, 2013

(54) RADIO COMMUNICATION DEVICE AND RADIO COMMUNICATION METHOD

(75) Inventor: Tomoyoshi Yokota, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 303 days.

(21) Appl. No.: 12/919,644

(22) PCT Filed: Feb. 27, 2009

(86) PCT No.: PCT/JP2009/053689
§ 371 (c)(1),
(2), (4) Date: Aug. 26, 2010

(87) PCT Pub. No.: WO2009/107781
PCT Pub. Date: Sep. 3, 2009

(65) Prior Publication Data
US 2010/0329191 A1   Dec. 30, 2010

(30) Foreign Application Priority Data

Feb. 28, 2008   (JP) ................................ 2008-048764

(51) Int. Cl.
*H04W 4/00*   (2009.01)

(52) U.S. Cl.
USPC ........................................................ 370/328

(58) Field of Classification Search
USPC .................... 370/328; 455/127.1, 422.1–460, 455/524–525; 713/300–340
See application file for complete search history.

(56) References Cited

U.S. PATENT DOCUMENTS 7,054,634 B2 *  5/2006  Watanabe et al. ............. 455/440
2009/0258616 A1 * 10/2009  Miura et al. ............... 455/127.1

FOREIGN PATENT DOCUMENTS

| JP | 2007-266987 A | 10/2007 |
| JP | 2008-011452 A | 1/2008 |
| KR | 10-2007-0039160 A | 2/2007 |
| WO | 2007/148391 A1 | 12/2007 |
| WO | WO 2007148391 A1 * | 12/2007 |

OTHER PUBLICATIONS

International Search Report dated May 19, 2009, issued by the Japanese Patent Office for International Application No. PCT/JP2009/053689.
Notice of Grounds for Rejection dated Jan. 10, 2012, issued in counterpart Korean Application No. 1-2010-7020888.
Notification of Reasons for Refusal dated May 8, 2012, issued in counterpart Japanese Application No. 2008-048764.

* cited by examiner

*Primary Examiner* — Mark Rinehart
*Assistant Examiner* — Mang Yeung
(74) *Attorney, Agent, or Firm* — Procopio, Cory, Hargreaves & Savitch LLP

(57) ABSTRACT

A wireless communication device includes a battery voltage monitoring section, which monitors the amount of decline in output voltage when a network connection section is connected to a wireless communication network to which the wireless communication device should be connected based on a communication, request; and an operation control section, which selects fewer wireless communication networks than the wireless communication device should be connected to based on the communication request if a predicted voltage calculated by subtracting the amount of decline from the output voltage is less than or equal to a predetermined threshold, and connects the network connection section to the selected one or more wireless communication networks. Based on the amount of decline, the operation control section selects one or more wireless communication networks so that the predicted voltage exceeds the predetermined threshold.

20 Claims, 8 Drawing Sheets

| | | WEAK ELECTRIC FIELD (RSSI: not greater than −75dBm) | INTERMEDIATE ELECTRIC FIELD (RSSI: between −75dBm and −65dBm) | INTENSE ELECTRIC FIELD (RSSI: not less than −65dBm) |
|---|---|---|---|---|
| RADIO COMMUNICATION NW 1 | DOWNLINK | Rate=100kbps, Delay=150ms | Rate=250kbps, Delay=100ms | Rate=500kbps, Delay=60ms |
| | UPLINK | Rate=16.2kbps, Delay=250ms | Rate=50kbps, Delay=150ms | Rate=100kbps, Delay=100ms |
| RADIO COMMUNICATION NW 2 | DOWNLINK | Rate=500kbps, Delay=80ms | Rate=1Mbps, Delay=50ms | Rate=2Mbps, Delay=30ms |
| | UPLINK | Rate=200kbps, Delay=200ms | Rate=500kbps, Delay=100ms | Rate=1Mbps, Delay=50ms |
| RADIO COMMUNICATION NW 3 | DOWNLINK | Rate=700kbps, Delay=40ms | Rate=1.5Mbps, Delay=20ms | Rate=3Mbps, Delay=10ms |
| | UPLINK | Rate=400kbps, Delay=60ms | Rate=1Mbps, Delay=30ms | Rate=2Mbps, Delay=15ms |

| BATTERY OUTPUT VOLTAGE (V) DROP AMOUNT Vd | 4.2 | 4.1 | 4 | 3.9 | 3.8 | 3.7 | 3.6 | 3.5 | 3.4 |
|---|---|---|---|---|---|---|---|---|---|
| RADIO COMMUNICATION NW 1 | 0.1 | 0.11 | 0.12 | 0.13 | 0.14 | 0.15 | 0.16 | 0.17 | 0.18 |
| RADIO COMMUNICATION NW 2 | 0.12 | 0.13 | 0.14 | 0.15 | 0.16 | 0.17 | 0.18 | 0.19 | 0.2 |
| RADIO COMMUNICATION NW 3 | 0.14 | 0.15 | 0.16 | 0.17 | 0.18 | 0.19 | 0.2 | 0.21 | 0.22 |
| ⋮ | ⋮ | ⋮ | ⋮ | ⋮ | ⋮ | ⋮ | ⋮ | ⋮ | ⋮ |
| RADIO COMMUNICATION NW n | 0.15 | 0.16 | 0.17 | 0.18 | 0.19 | 0.2 | 0.21 | 0.22 | 0.23 |

RADIO COMMUNICATION DEVICE AND RADIO COMMUNICATION METHOD

TECHNICAL FIELD

The present invention relates to a radio communication device that operates on a battery and is connectable to multiple radio communication networks, and also relates to a radio communication method used in the radio communication device.

BACKGROUND ART

In recent years, along with advancement of radio communication technologies, a radio communication device connectable to a multiple radio communication networks using different communication methods has been proposed (Patent Document 1, for example). Such a radio communication device (a mobile communication terminal, for example) connectable to multiple radio communication networks generally operates on a battery and also includes multiple network connection units (for a mobile phone network, and for a wireless LAN, for example) corresponding to the number of connectable radio communication networks. In addition, each of the network connection units generally has a power amplifier for amplifying a radio signal.

When connecting to multiple radio communication networks, the radio communication device starts the network connection units used for transmitting and receiving radio signals to and from the respective communication networks. Specifically, when connecting to multiple radio communication networks, the radio communication device starts multiple power amplifiers.

PATENT DOCUMENT 1: Japanese Patent Application Publication No. 2007-266987 (page 9 and 10, FIG. 1)

DISCLOSURE OF THE INVENTION

The conventional radio communication device described above, however, has the following problem. Specifically, the problem is that, since the radio communication device starts multiple power amplifiers when connecting to multiple radio communication networks, an output voltage of a battery driving the power amplifiers drops.

More specifically, when multiple power amplifiers are driven by using a battery whose output voltage has already dropped from a fully charged state as a result of being used for at least a certain time period after the charging of the battery, the output voltage of the battery may drop to a voltage that causes a protection circuit to operate. When the output voltage of the battery drops to the voltage that causes the protection circuit to operate, there occurs a problem that communications being performed are interrupted, or communications cannot be started.

In this respect, the present invention has been made in view of the aforementioned circumstances. An objective of the present invention is to provide a radio communication device and a radio communication method each capable of performing desired communications to the utmost extent even in a case where the output voltage of a battery drops.

To solve the aforementioned problem, the present invention has the following aspects. To begin with, a first aspect of the present invention is summarized as a radio communication device (radio communication device 100) operating on a battery (battery 119) and connectable to a plurality of radio communication networks (radio communication network 1, radio communication network 2, and radio communication network 3), the device comprising: a network connection unit (network connection unit $101_1$, network connection unit $101_2$, and network connection unit $101_3$) configured to connect to each of the radio communication networks by use of radio signals (radio signals RS); a voltage detector (battery voltage detection circuit 130) configured to detect an output voltage (output voltage Vy) outputted from the battery; a communication request receiver (communication request receiver 105) configured to receive a communication request from an application (application 111) to be executed in the radio communication device, the communication request involving connection to a plurality of the radio communication networks via the network connection unit; a voltage drop amount acquisition unit (battery voltage monitoring unit 121) configured to acquire a drop amount (drop amount Vd) of the output voltage for a case where each of the network connection unit connects to each of the radio communication networks to be connected on the basis of the communication request; and an operation controller (operation controller 109) configured to select, in a case where an expected voltage (expected voltage Vexp 12, for example) obtained by subtracting the drop amount from the output voltage is equal to or less than a predetermined threshold value (threshold voltage Vthld), a fewer number of the radio communication networks than the number of the radio communication networks to be connected on the basis of the communication request, and then to cause at least one of the network connection units to connect to a candidate radio communication network which is the selected one of or plurality of the radio communication networks, wherein the operation controller selects, on the basis of the drop amount, one or a plurality of the radio communication networks as the candidate radio communication network in such a way that the expected voltage exceeds the predetermined threshold.

According to the radio communication device described above, when an expected voltage is not greater than a predetermined threshold, a fewer number of radio communication networks than the number of radio communication networks to be connected on the basis of a communication request involving connection to radio communication networks are selected, and a network connection unit is connected to a selected candidate radio communication network. Further, the candidate radio communication network to be connected is selected in such a way that the expected voltage exceeds the predetermined voltage.

Thus, it is possible to perform desired communications to the utmost extent while avoiding occurrence of a situation where communications cannot be performed due to a drop of the output voltage to a voltage causing a protection circuit to operate.

A second aspect of the present invention is summarized as the radio communication device according to the first aspect of the present invention, wherein the operation controller selects, on the basis of the drop amount, one or a plurality of the radio communication networks as the candidate communication network in such a way that the expected voltage becomes the highest.

A third aspect of the present invention is summarized as the radio communication device according to the first aspect of the present invention, further comprising a throughput acquisition unit configured to acquire a throughput of data transmitted and received by the radio communication device via each of the radio communication networks, wherein the operation controller selects one or more of the radio communication networks as the candidate communication network in such a way that the expected voltage exceeds the predetermined threshold and also that the throughput acquired by the throughput acquisition unit is maximized.

A fourth aspect of the present invention is summarized as the radio communication device according to the third aspect of the present invention, wherein the throughput acquisition unit acquires the throughput on the basis of a network performance table in which the radio communication networks and the throughputs are associated with each other.

A fifth aspect of the present invention is summarized as the radio communication device according to the first aspect to the fourth aspect of the present invention, wherein the voltage drop amount acquisition unit acquires the drop amount on the basis of a voltage drop amount table in which the radio communication networks and the voltage drop amounts are associated with each other.

A sixth aspect of the present invention is summarized as a radio communication method used in a radio communication device operating on a battery and including a network connection unit connectable to a plurality of radio communication networks by use of radio signals, the method comprising the steps of: detecting an output voltage outputted from the battery; receiving a communication request from an application executed in the radio communication device, the communication request involving connection to some of the radio communication networks via the network connection unit; acquiring a drop amount of the output voltage for a case where the network connection unit connects to each of the radio communication networks to be connected on the basis of the communication request; selecting a fewer number of the radio communication networks than the number of radio communication networks to be connected on the basis of the communication request, in a case where an expected voltage obtained by subtracting the drop amount from the output voltage is equal to or less than a predetermined threshold; and causing the network connection unit to connect to a candidate radio communication network which is the selected one or more of the radio communication networks, wherein in the step of selecting the radio communication network, one or more of the radio communication networks are selected as the candidate communication network on the basis of the drop amount in such a way that the expected voltage exceeds the predetermined threshold.

A seventh aspect of the present invention is summarized as a radio communication device operating on a battery and connectable to a plurality of radio communication networks, the device comprising: a network connection unit configured to connect to each the radio communication networks by use of a radio signal; a voltage detector configured to detect an output voltage outputted from the battery in a state where the network connection unit is connected to each of the radio communication networks; a voltage drop amount acquisition unit configured to acquire a drop amount of the output voltage associated with each of the radio communication networks to which the network connection unit connects; and an operation controller configured to select the radio communication network whose connection via the network connection unit is to be disconnected, in a case where the output voltage acquired by the voltage detector is equal to or less than a predetermined threshold value, and then causing the connection between a candidate radio connection network which is the selected one or more of the radio communication networks and the network connection unit to be disconnected, wherein the operation controller selects one or more of the radio communication networks as the candidate radio communication network on the basis of the drop amount in such a way that the output voltage exceeds the predetermined threshold when the connection via the network connection unit is disconnected.

According to the radio communication device described above, when the output voltage is not greater than a predetermined threshold, a radio communication network which is connected via a network connection unit and which is to be disconnected is selected, and then, the connection between the selected candidate radio communication network and the network connection unit is disconnected. Further, the candidate radio communication network to be disconnected is selected in such a way that the output voltage exceeds a predetermined threshold when the network connection unit is disconnected from the radio communication network.

Thus, it is possible to perform desired communications to the utmost extent while avoiding occurrence of a situation where communications cannot be performed due to a drop of the output voltage to a voltage causing a protection circuit to operate.

A eighth aspect of the present invention is summarized as the radio communication device according to the seventh aspect of the present invention, on the basis of the drop amounts, the operation controller disconnects the network connection unit for which the drop amount is the largest.

A ninth aspect of the present invention is summarized as the radio communication device according to the seventh aspect of the present invention, further comprising a throughput acquisition unit configured to acquire a throughput of data to be transmitted and received by the radio communication device via each of the radio communication networks, wherein the operation controller selects one or more of the radio communication networks as the candidate radio communication network in such a way that the output voltage exceeds the predetermined threshold and also that the throughput acquired by the throughput acquisition unit is maximized when the candidate radio communication network is disconnected.

A tenth aspect of the present invention is summarized as the radio communication device according to the ninth aspect of the present invention, wherein the throughput acquisition unit acquires the throughput on the basis of a network performance table in which the radio communication networks and the throughputs are associated with each other.

A eleventh aspect of the present invention is summarized as the radio communication device according to the seventh aspect to the tenth aspect of the present invention, wherein the voltage drop amount acquisition unit acquires the drop amount on the basis of a voltage drop amount table in which the radio communication networks and the voltage drop amounts are associated with each other.

A twelfth aspect of the present invention is summarized as a radio communication method used in a radio communication device operating on a battery and including a network connection unit connectable to a plurality of radio communication networks by use of radio signals, the method comprising the steps of: detecting an output voltage outputted from the battery in a state where the network connection unit connects to each the radio communication networks; acquiring a drop amount of the output voltage associated with each of the radio communication networks to which the network connection unit connects; selecting the radio communication network whose connection via the network connection unit is to be disconnected, in a case where the acquired output voltage is equal to or less than a predetermined threshold; and causing the connection between a candidate radio communication network which is the selected one or more of the radio communication networks and the network connection unit to be disconnected, wherein in the step of the selecting the radio communication network, one or more of the radio communication networks are selected as the candidate radio communication network on the basis of the drop amount in such a way that the output voltage exceeds the predetermined threshold when the connection via the network connection unit is disconnected.

According to the aspects of the present invention, it is possible to provide a radio communication device and a radio communication method each capable of performing desired communications to the utmost extent even when an output voltage of a battery drops.

BEST MODE FOR CARRYING OUT THE INVENTION

Next, an embodiment of the present invention will be described. Specifically, descriptions will be given of (1) Overall Schematic Configuration of Communication Network, (2) Functional Block Configuration of Radio Communication Device, (3) Operation of Radio Communication Device, (4) Advantages and Effects, and (5) Other Embodiments.

Note that, in the following description of the drawings, same or similar reference marks denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of Communication Network

Figure 1:
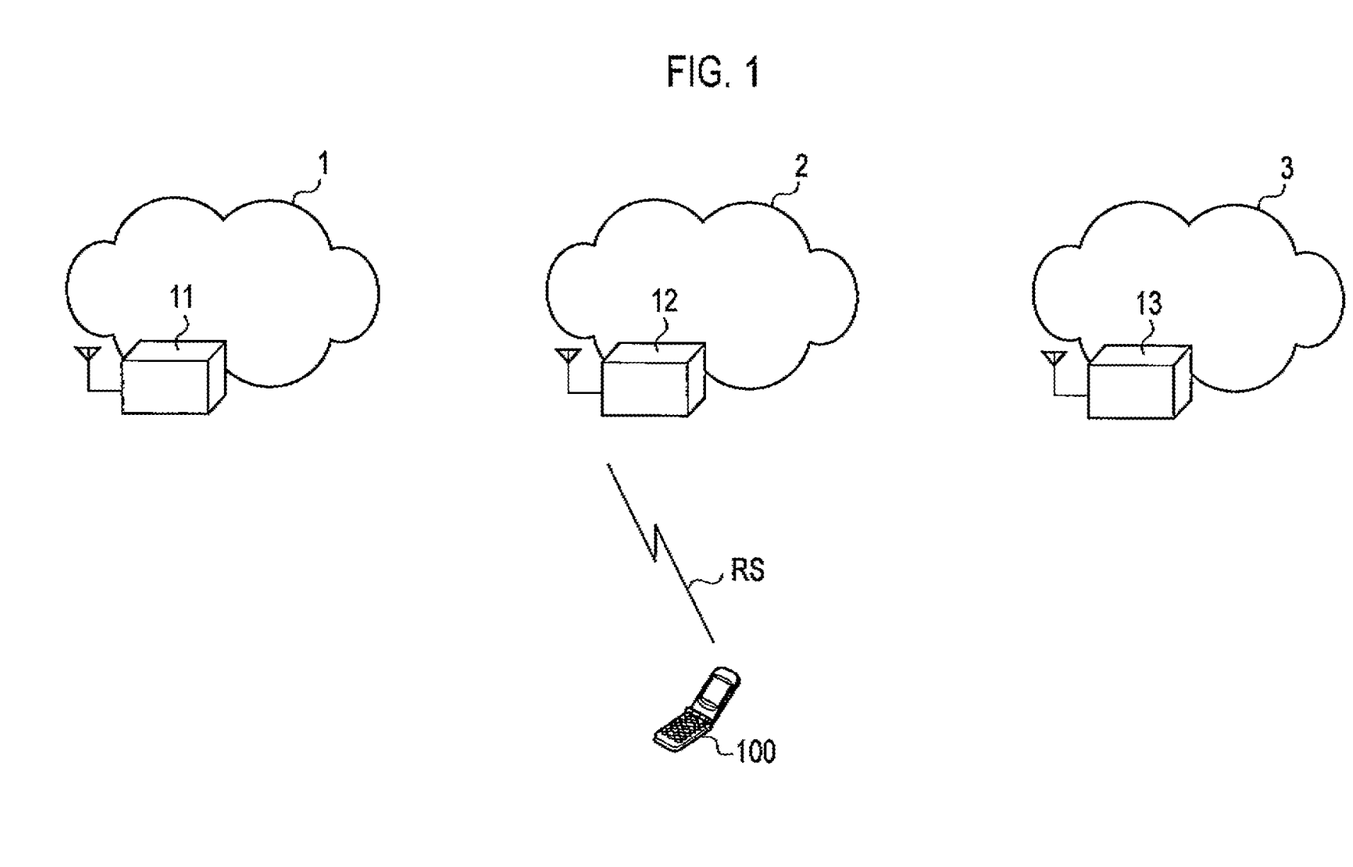
FIG. 1 is an overall schematic configuration diagram of a communication network according to an embodiment of the present invention.

FIG. 1 is an overall schematic configuration diagram of a communication network according to this embodiment. As shown in FIG. 1, radio communication networks 1, 2 and 3 form the communication network in this embodiment. The radio communication networks 1, 2 and 3 employ different communication methods.

The radio communication network 1 is a mobile phone network using a cdma system (such as cdma2000), for example. The radio communication network 2 is compliant with the Mobile WiMAX specified in IEEE 802.16e, for example. The radio communication network 3 is compliant with the wireless LAN specified in IEEE 802.11g, for example.

The radio communication networks 1, 2 and 3 respectively include radio base stations 11, 12 and 13, each of which transmits and receives a radio signal RS to and from a radio communication device 100.

The radio communication device 100 is capable of connecting to multiple radio communication networks, i.e., the radio communication networks 1, 2 and 3 by use of radio signals RS. The radio communication device 100 is a portable small radio communication terminal in this embodiment. The radio communication device 100 operates on a battery 119 (not shown in FIG. 1 but refer to FIG. 2).

(2) Functional Block Configuration of Radio Communication Device

Figure 2:
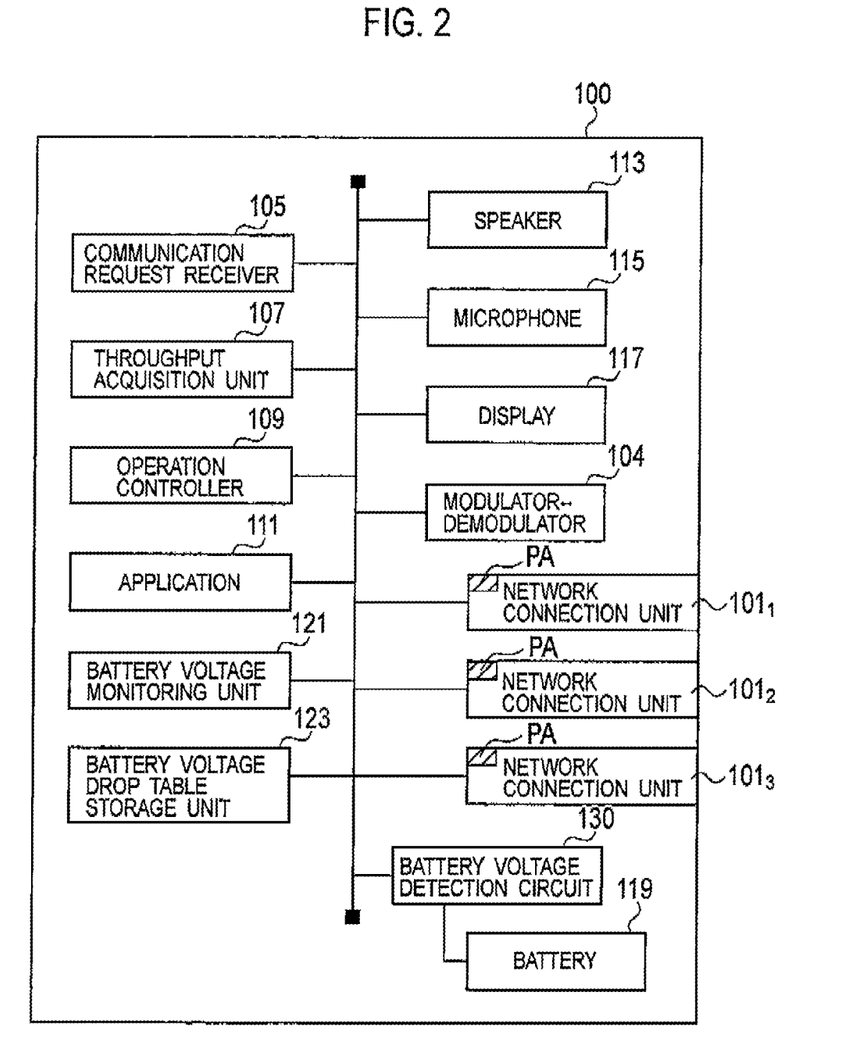
FIG. 2 is a functional block configuration diagram of a radio communication device 100 according to the embodiment of the present invention.

FIG. 2 shows a functional block configuration diagram of the radio communication device 100. As shown in FIG. 2, the radio communication device 100 includes network connection units $101_1$, $101_2$ and $101_3$, a modulator-demodulator 104, a communication request receiver 105, a throughput acquisition unit 107, an operation controller 109, an application 111, a speaker 113, a microphone 115 and a display 117.

Note that, hereinafter, a description will be mainly given of a portion relating to the present invention. Accordingly, it should be noted that there is a case where the radio communication device 100 includes a block required for realizing a function as the radio communication device 100, although the block is not illustrated in the drawings or the description thereof is omitted.

In addition, the radio communication device 100 includes the battery 119 which supplies power to each of the functional blocks. Further, for the purpose of controlling an operation of the radio communication device 100 in relation with the battery 119, the radio communication device 100 includes a battery voltage monitoring unit 121, a battery voltage drop table storage unit 123 and a battery voltage detection circuit 130.

The network connection unit $101_1$ provides a communication interface for connecting to the radio communication network 1 (cdma2000), i.e., the radio base station 11 by use of a radio signal RS.

The network connection unit $101_2$ provides a communication interface for connecting to the radio communication network 2 (mobile WiMAX), i.e., the radio base station 12 by use of a radio signal RS.

The network connection unit $101_3$ provides a communication interface for connecting to the radio communication network 3 (wireless LAN), i.e., the radio base station 13 by use of a radio signal RS.

Each of the network connection units $101_1$, $101_2$ and $101_3$ includes a power amplifier PA for transmitting a radio signal RS with a desired transmission power.

The modulator-demodulator 104 executes modulation processing for IP packets or the like outputted from the application 111 and also executes demodulation processing for signals outputted from the network connection units $101_1$, $101_2$ and $101_3$.

The communication request receiver 105 receives a communication request from the application 111. The communication request receiver 105 requests the operation controller 109 for connection to a radio communication network on the basis of the communication request received from the application 111.

In particular, the communication request receiver 105 receives from the application 111 a communication request involving connection to multiple radio communication networks via network connection units in this embodiment. Specifically, the communication request receiver 105 receives from the application 111 a communication request including required communication rates (or bands).

The communication request receiver 105 determines on the basis of the communication rates included in the communication request whether or not to simultaneously connect to the multiple radio communication networks, and then requests the operation controller 109 for connection to one or multiple radio communication networks. Specifically, the communication request receiver 105 receives from the application 111 a communication request involving connection to multiple radio communication networks (radio communication networks 1 and 2) by use of multiple network connection units (network connection units $101_1$ and $101_2$, for example) among the network connection units $101_1$, $101_2$ and $101_3$.

The throughput acquisition unit 107 acquires throughputs of data transmitted or received by the radio communication device 100 via the network connection units $101_1$, $101_2$ and $101_3$.

Figure 6:
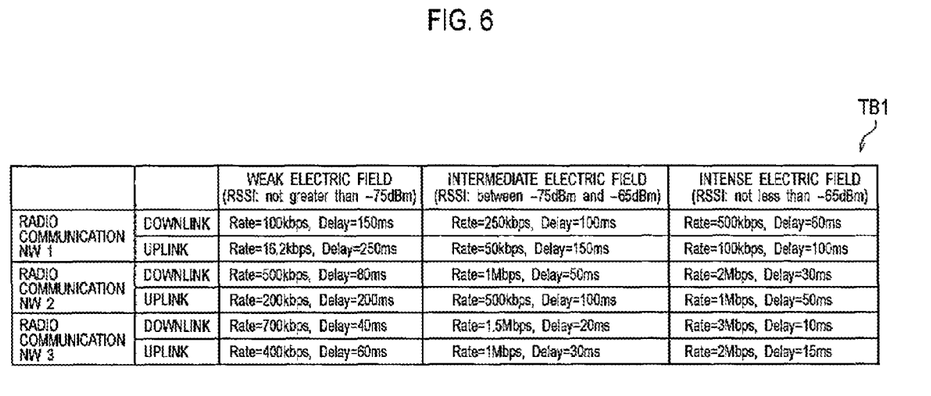
FIG. 6 is a diagram illustrating an example of a network performance table TB 1 according to the embodiment of the present invention.

As shown in FIG. 6, the throughput acquisition unit 107 acquires a throughput of each of the radio communication networks on the basis of a network performance table TB 1 in which the radio communication networks are associated with throughputs (communication rates).

In this embodiment, the network performance table TB 1 shows uplink and downlink throughputs (communication rates: in the unit of kbps) and propagation delays (in the unit of msec) in each of the radio communication networks. In addition, in this embodiment, the throughputs and propagation delays of each of the radio communication networks are associated with each of a weak electric field (where RSSI is not greater than −75 dBm), an intermediate electric field (where RSSI is between −75 dBm and −65 dBm) and an intense electric field (where RSSI is not less than −65 dBm).

The operation controller 109 controls an operation of the radio communication device 100, such as a handover to another radio communication network. In particular, in this embodiment, the operation controller 109 controls, on the basis of a drop amount Vd of an output voltage Vy of the battery 119, connection to the radio communication networks 1, 2 and 3 via the network connection units $101_1$, $101_2$ and $101_3$.

Specifically, the operation controller 109 calculates an expected voltage Vexp by subtracting a drop amount Vd of an output voltage Vy from a current output voltage Vy, the drop amount Vd corresponding to a case where the network connection units (network connection units $101_1$ and $101_2$) connect to the radio communication networks (radio communication networks 1 and 2, for example) to be connected on the basis of the communication request received by the communication request receiver 105.

When the expected voltage Vexp obtained by subtracting the drop amount Vd from the output voltage Vy is not greater than a threshold voltage Vthld (predetermined threshold), the operation controller 109 selects a fewer number of radio communication networks than the number of radio communication networks to be connected on the basis of the communication request received by the communication request receiver 105.

In addition, the operation controller 109 causes a corresponding one or more of network connection units (network connection units $101_1$, $101_2$ and $101_3$) to connect to the selected one or multiple radio communication networks (hereinafter, referred to as a candidate radio communication network(s) as appropriate). Specifically, the operation controller 109 selects one or multiple radio communication networks as the candidate radio communication networks in such a way that the expected voltage Vexp exceeds the threshold voltage Vthld (3.6V, for example) on the basis of the drop amount Vd in a case where the network connection units connect to the candidate radio communication networks, e.g., the radio communication networks 1 and 2, that is, the drop amount Vd in a case where the network connection unit $101_2$ connects to the radio communication network 2 in a state where the network connection unit $101_1$ is connected to the radio communication network 1.

Figure 8:
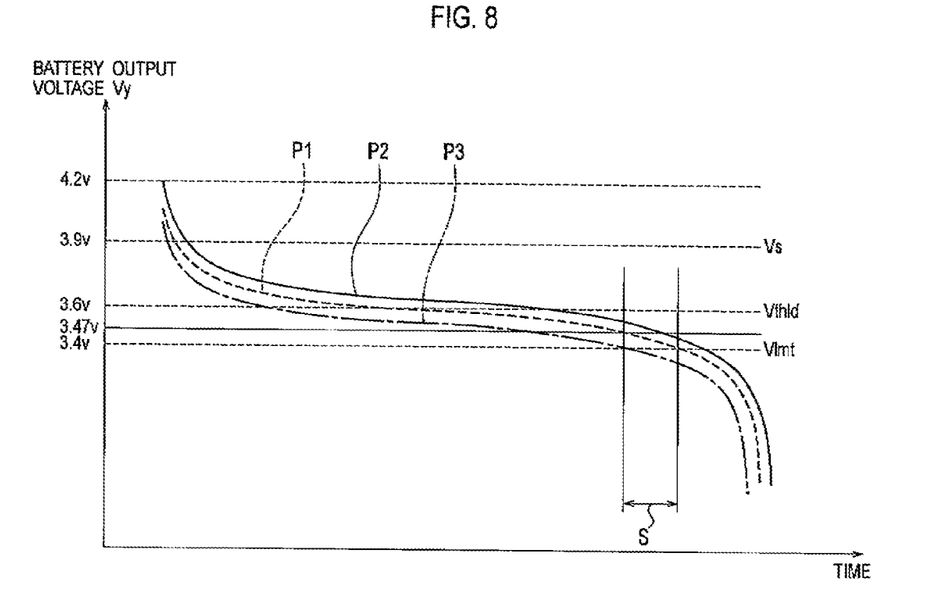
FIG. 8 is a diagram illustrating a variation example of an output voltage Vy due to consumption of a battery 119 according to the embodiment of the present invention.

Here, FIG. 8 shows a variation example of the output voltage Vy due to consumption of the battery 119. A discharge curve P1 shows a change state of the output voltage Vy when the power amplifier PA of the network connection unit $101_1$ is turned on. A discharge curve P2 shows a change state of the output voltage Vy when the network connection units $101_1$, $101_2$ and $101_3$ are all turned off. A discharge curve P3 shows a change state of the output voltage Vy when the power amplifiers PA of the network connection units $101_1$ and $101_2$ are turned on.

A lower limit voltage Vlmt is a voltage (3.4V) causing a protection circuit (not shown) to operate. As shown in FIG. 8, the radio communication device 100 is allowed to simultaneously connect to the radio communication networks 1 and 2 only at a point in time before the starting point (3.47V) of a section S. In this respect, the threshold voltage Vthld is set to 3.6V, which is 0.2V higher than the lower limit voltage Vlmt in this embodiment.

Figure 7:
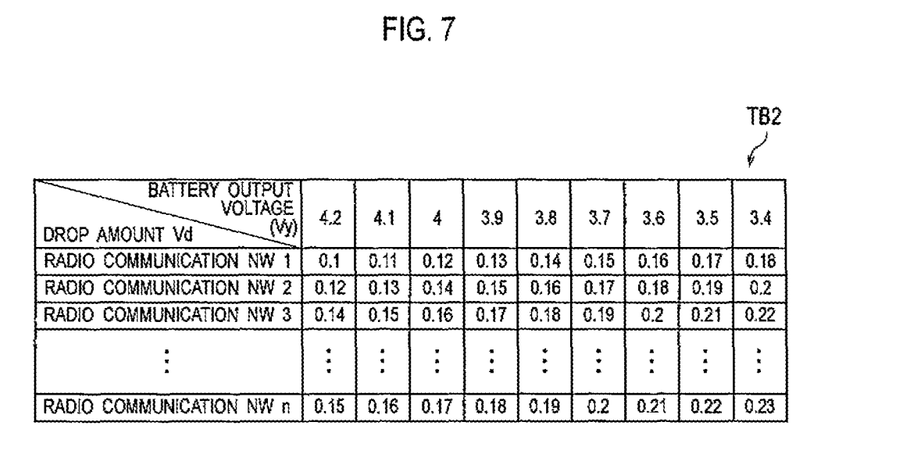
FIG. 7 is a diagram illustrating an example of a battery voltage drop table TB 2 according to the embodiment of the present invention.

FIG. 7 shows a battery voltage drop table TB 2 stored in the battery voltage drop table storage unit 123. When the current output voltage Vy is 3.8V, for example, the drop amount Vd becomes 0.16V when the network connection unit $101_2$ connects to the radio communication network 2 in a state where the network connection unit $101_1$ is connected to the radio communication network 1. Accordingly, the expected voltage Vexp becomes 3.64V (3.8V-0.16V). In addition, when multiple network connection units are simultaneously started, the determination can be made by use of sum of drop amounts Vd with respect to the output voltage Vy of the battery at that time.

In this embodiment, the operation controller 109 can select, on the basis of a drop amount Vd, one or multiple radio communication networks as a candidate radio communication network in such a way that the expected voltage Vexp becomes the highest voltage. Further, the operation controller 109 can select one or multiple radio communication networks as a candidate radio communication network in such a way that the expected voltage Vexp exceeds the threshold voltage Vthld (3.6V) and also that the throughput acquired by the throughput acquisition unit 107 becomes the largest.

In addition, the operation controller 109 can operate in the following manner when multiple network connection units among the network connection units $101_1$ $101_2$ and $101_3$ are respectively connected to radio communication networks. Specifically, when the output voltage Vy acquired by the battery voltage detection circuit 130 is not greater than the threshold voltage Vthld, the operation controller 109 selects a radio communication network to be disconnected, which is connected via a network connection unit. Note that, the threshold voltage Vthld used in selecting a radio communication network to be disconnected, which is connected via a network connection unit, may be different from the threshold voltage Vthld used in selecting a radio communication network to which a network connection unit is to be connected.

Further, the operation controller 109 causes the connection between the selected one or multiple radio communication network, i.e., the candidate radio communication network (radio communication network 3, for example) and the network connection unit (network connection unit $101_3$) to be disconnected. Specifically, the operation controller 109 instructs the network connection unit (network connection unit $101_3$) corresponding to the selected candidate radio communication network to disconnect from the radio communication network.

The operation controller 109 selects, on the basis of the drop amount Vd associated with the radio communication network in connection, one or multiple radio communication networks as a candidate radio communication network in such a way that the output voltage Vy exceeds the threshold voltage Vthld by disconnecting the connection to the network connection unit.

In this embodiment, the operation controller 109 can select, on the basis of the drop amount Vd associated with the radio communication network in connection, one or multiple radio communication networks as a candidate radio communication network in such a way that the expected voltage Vexp to be described later exceeds the threshold voltage Vthld. Further, the operation controller 109 can also select one or multiple radio communication networks as a candidate radio communication network in such a way that the output voltage Vy exceeds the threshold voltage Vthld when the selected radio communication network is disconnected, and also the throughput acquired by the throughput acquisition unit 107 becomes the largest value.

The application 111 is configured of an application program (voice call application using VoIP or TV phone application, for example) realizing a function provided by the radio communication device 100. As described above, the application 111 transmits a communication request to the communication request receiver 105. Specifically, the application 111 transmits a communication request including a required communication rate (band) to the communication request receiver 105.

The speaker 113 outputs a predetermined audible band signal on the basis of control by the application 111 or the operation controller 109. Particularly, in this embodiment, when the expected voltage Vexp computed by the operation controller 109 is determined to be lower than the lower limit voltage Vlmt, the speaker 113 is capable of outputting an alarm sound to notify the user of the radio communication device 100 that the currently performed communications may be interrupted because a handover to another radio communication network cannot be executed.

The microphone 115 converts an inputted audio or the like into an electric signal and then outputs the electric signal to the application 111.

The display 117 is configured of a small liquid crystal display device. The display 117 displays an image on the basis of control by the application 111 or the operation controller 109.

The battery 119 supplies power required for operating each functional block forming the radio communication device 100. In this embodiment, the battery 119 is made of a cell lithium-ion battery.

The battery voltage monitoring unit 121 performs monitoring of the output voltage Vy outputted from the battery 119 and monitoring of the drop amount Vd of the output voltage Vy, caused by the start of a network connection unit.

Particularly, in this embodiment, the battery voltage monitoring unit 121 acquires the drop amount Vd of the output voltage Vy of a case where a network connection unit connects to a radio communication network to be connected on the basis of a communication request from the application 111. In this embodiment, the battery voltage monitoring unit 121 forms a voltage drop amount acquisition unit.

In addition, the battery voltage monitoring unit 121 acquires the drop amount Vd of the output voltage Vy associated with a radio communication network to which a network connection unit is connected.

Specifically, the battery voltage monitoring unit 121 acquires a drop amount Vd associated with a radio communication network and an output voltage Vy on the basis of the battery voltage drop table TB 2 (refer to FIG. 7) in which radio communication networks and drop amounts Vd are associated with each other. In this embodiment, the battery voltage drop table TB 2 forms a voltage drop amount table.

The battery voltage drop table storage unit 123 stores therein the battery voltage drop table TB 2 (refer to FIG. 7) to which the battery voltage monitoring unit 121 refers. As shown in FIG. 7, the battery voltage drop table TB 2 is formed of output voltages Vy and drop amounts Vd of the output voltages Vy corresponding to the cases where the radio communication device connect to the respective radio communication networks.

Note that, there is a factor causing an output voltage Vy to drop, besides the start of a network connection unit (power amplifier), but the start of a power amplifier is considered to be a dominant factor to cause an output voltage Vy to drop in this embodiment. Thus, the battery voltage drop table TB 2 showing drop amounts Vd due to the presence or absence of the start of multiple network connection units (power amplifiers) is prepared.

The battery voltage detection circuit 130 detects an output voltage Vy outputted from the battery 119. The battery voltage detection circuit 130 forms a voltage detector in this embodiment.

The battery voltage detection circuit 130 detects an output voltage Vy in a predetermined cycle (60 seconds, for example) and notifies the operation controller 109 of the detected output voltage Vy. Specifically, the battery voltage detection circuit 130 is capable of detecting an output voltage Vy outputted from the battery 119 in both states where a network connection unit is connected to a radio communication network and where no network connection unit is connected to a radio communication network.

(3) Operation of Radio Communication Device

Next, an operation of the radio communication device 100 will be described. Specifically, a description will be given of an operation to select a radio communication network by the radio communication device 100.

(3.1) Operation Example 1

Figure 3:
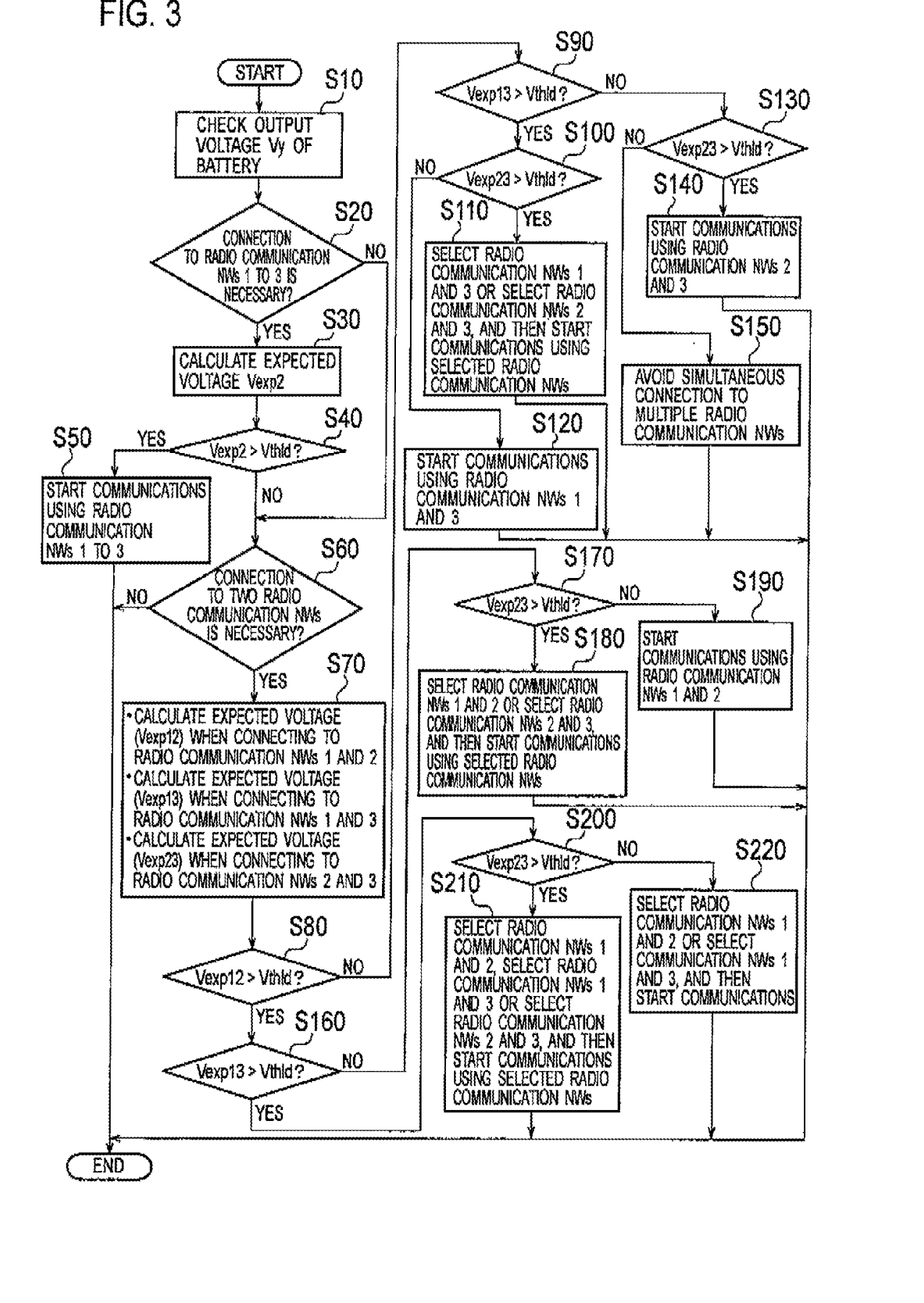
FIG. 3 is a flowchart showing an operation flow (operation example 1) of selecting a radio communication network by the radio communication device 100 according to the embodiment of the present invention.

FIG. 3 shows an operation flow of selecting a radio communication network by the radio communication device 100. As shown in FIG. 3, the radio communication device 100 checks an output voltage Vy of the battery 119 in step S10.

In step S20, the radio communication device 100 determines whether or not connection to all the radio communication networks 1, 2 and 3 is necessary. Specifically, the radio communication device 100 determines on the basis of a communication request received from the application 111 whether or not connection to all the radio communication networks 1, 2 and 3 is necessary. Here, suppose that connection to the radio communication network 2 becomes necessary in a state where the radio communication networks 1 and 3 have been already connected.

When connection to a radio communication network is necessary (Yes in step S20), the radio communication device 100 calculates in step S30 an expected voltage Vexp2 of a case where the radio communication device 100 is further connected to the radio communication network 2.

In step S40, the radio communication device 100 determines whether or not the expected voltage Vexp2 is higher than a threshold voltage Vthld.

When the expected voltage Vexp2 is higher than the threshold voltage Vthld (Yes in step S40), the radio communication device 100 starts communications by using all the radio communication networks 1, 2 and 3 in step S50.

When the expected voltage Vexp2 is not higher than the threshold voltage Vthld (No in step S40), the radio communication device 100 determines in step S60 whether or not connection to two radio communication networks is necessary. Specifically, since the output voltage Vy decreases, the radio communication device 100 cannot connect to all the radio communication networks 1, 2 and 3, but the radio communication device 100 determines whether or not connection to two radio communication networks is necessary, on the basis of the communication request received from the application 111.

When connection to two radio communication networks is necessary (YES in step S60), the radio communication device 100 calculates in step S70 expected voltages in the following cases, respectively.

An expected voltage Vexp12 in a case where the radio communication device 100 connects to the radio communication networks 1 and 2.

An expected voltage Vexp13 in a case where the radio communication device 100 connects to the radio communication networks 1 and 3.

An expected voltage Vexp23 in a case where the radio communication device 100 connects to the radio communication networks 2 and 3.

In step S80, the radio communication device 100 determines whether or not the expected voltage Vexp12 is higher than the threshold voltage Vthld.

When the expected voltage Vexp12 is not higher than the threshold voltage Vthld (NO in step S80), in step S90, the radio communication device 100 determines whether or not the expected voltage Vexp13 is higher than the threshold voltage Vthld.

When the expected voltage Vexp13 is higher than the threshold voltage Vthld (YES in step S90), in step S100, the radio communication device 100 determines whether or not the expected voltage Vexp23 is higher than the threshold voltage Vthld.

When the expected voltage Vexp23 is higher than the threshold voltage Vthld (YES in step S100), in step S110, the radio communication device 100 selects anyone of combinations of the radio communication networks 1 and 3, and the radio communication networks 2 and 3, and then starts communications by using the selected two radio communication networks.

When the expected voltage Vexp23 is not higher than the threshold voltage Vthld (NO in step S100), in step S120, the radio communication device 100 starts communications by using the radio communication networks 1 and 3.

When the expected voltage Vexp13 is not higher than the threshold voltage Vthld (NO in step S90), in step S130, the radio communication device 100 determines whether or not the expected voltage Vexp23 is higher than the threshold voltage Vthld.

When the expected voltage Vexp23 is higher than the threshold voltage Vthld (YES in step S130), in step S140, the radio communication device 100 starts communications by using the radio communication networks 2 and 3.

When the expected voltage Vexp23 is not higher than the threshold voltage Vthld (NO in step S130), in step S150, the radio communication device 100 determines to avoid simultaneous connection to multiple, i.e., two or more radio communication networks.

When the expected voltage Vexp12 is higher than the threshold voltage Vthld (YES in step S80), in step S160, the radio communication device 100 determines whether or not the expected voltage Vexp13 is higher than the threshold voltage Vthld.

When the expected voltage Vexp13 is not higher than the threshold voltage Vthld (NO in step S160), in step S170, the radio communication device 100 determines whether or not the expected voltage Vexp23 is higher than the threshold voltage Vthld.

When the expected voltage Vexp23 is higher than the threshold voltage Vthld (YES in step S170), in step S180, the radio communication device 100 selects any one of combinations of the radio communication networks 1 and 2, and the radio communication networks 2 and 3, and then starts communications by using the selected two radio communication networks.

When the expected voltage Vexp23 is not higher than the threshold voltage Vthld (NO in step S170), in step S190, the radio communication device 100 starts communications by using the radio communication networks 1 and 2.

When the expected voltage Vexp13 is higher than the threshold voltage Vthld (YES in step S160), in step S200, the radio communication device 100 determines whether or not the expected voltage Vexp23 is higher than the threshold voltage Vthld.

When the expected voltage Vexp23 is higher than the threshold voltage Vthld (YES in step S200), in step S210, the radio communication device 100 selects any one of combinations of the radio communication networks 1 and 2, the radio communication networks 1 and 3, and the radio communication networks 2 and 3, and then starts communications by using the selected two radio communication networks.

When the expected voltage Vexp23 is not higher than the threshold voltage Vthld (NO in step S200), in step S220, the radio communication device 100 selects anyone of combinations of the radio communication networks 1 and 2, and the radio communication networks 1 and 3, and then starts communications by using the selected two radio communication networks.

(3.2) Operation Example 2

Figure 4:
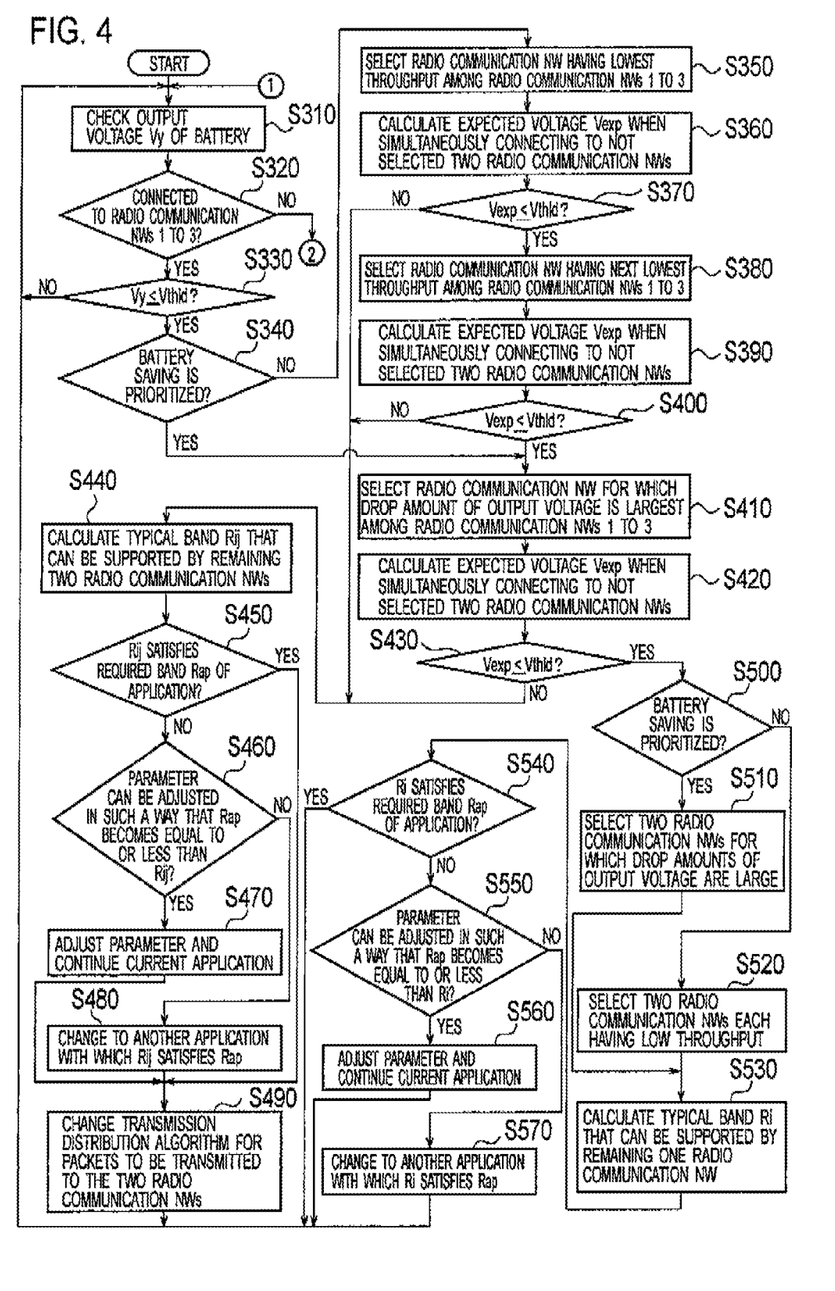
FIG. 4 is a flowchart showing an operation flow (operation example 2) of selecting a radio communication network by the radio communication device 100 according to the embodiment of the present invention.
Figure 5:
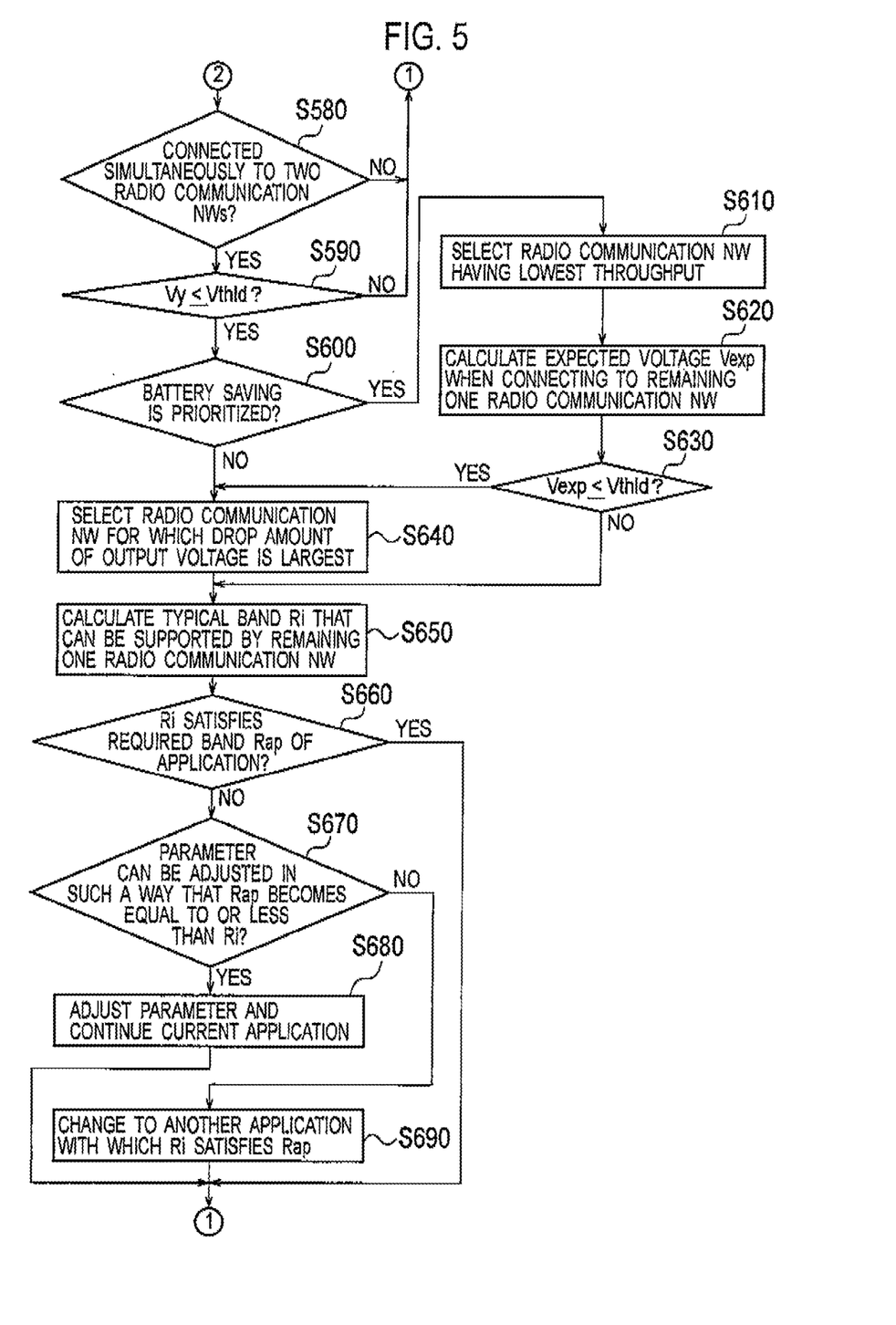
FIG. 5 is a flowchart showing the operation flow (operation example 2) of selecting a radio communication network by the radio communication device 100 according to the embodiment of the present invention.

FIGS. 4 and 5 show an operation flow of selecting a radio communication network by the radio communication device 100. Specifically, FIGS. 4 and 5 show operations to reduce the number of connected radio communication networks because of a reduction in the output voltage Vy of the battery 119.

As shown in FIG. 4, in step S310, the radio communication device 100 checks the output voltage Vy of the battery 119 in step S310.

In step S320, the radio communication device 100 determines whether or not the radio communication device 100 is connected to all the radio communication networks 1, 2 and 3.

When the radio communication device 100 is connected to all the radio communication networks 1, 2 and 3 (YES in step S320), the radio communication device 100 determines in step S330 whether or not the output voltage Vy is equal to or less than the threshold voltage Vthld.

When the output voltage Vy is equal to or less than the threshold voltage Vthld (YES in step S330), the radio communication device 100 determines in step S340 whether or not to prioritize battery saving that suppresses consumption of the battery 119.

When the battery saving is not prioritized (NO in step S340), the radio communication device 100 selects in step S350 a radio communication network having, the lowest throughput among the radio communication networks 1, 2 and 3.

Meanwhile, when the battery saving is prioritized (YES in step S340), the radio communication device 100 executes processing of step S410.

In step S360, the radio communication device 100 calculates an expected voltage Vexp of a case where the radio communication device 100 simultaneously connects to the two radio communication networks which have not been selected.

In step S370, the radio communication device 100 determines whether or not the expected voltage Vexp is equal to or less than the threshold voltage Vthld.

When the expected voltage Vexp is equal to or less than the threshold voltage Vthld (YES in step S370), the radio communication device 100 selects in step S380 a radio communication network having the next lowest throughput among the radio communication networks 1, 2 and 3.

In step S390, the radio communication device 100 calculates an expected voltage Vexp of a case where the radio communication device 100 simultaneously connects to the two radio communication networks which have not been selected.

In step S400, the radio communication device 100 determines whether or not the expected voltage Vexp is equal to or less than the threshold voltage Vthld.

When the expected voltage Vexp is equal to or less than the threshold voltage Vthld (YES in step S400), the radio communication device 100 selects in step S410 a radio communication network for which the drop voltage Vd of the output voltage Vy is the largest among the radio communication networks 1, 2 and 3.

In step S420, the radio communication device 100 calculates an expected voltage Vexp of a case where the radio communication device 100 simultaneously connects to the two radio communication networks which have not been selected.

In step S430, the radio communication device 100 determines whether or not the expected voltage Vexp is equal to or less than the threshold voltage Vthld.

When the expected voltage Vexp is higher than the threshold voltage Vthld (NO in step S430), the radio communication device 100 calculates in step S440 a typical band Rij (communication rate) that can be supported by the remaining two radio communication networks. Specifically, the radio communication device 100 calculates the band Rij on the basis of the network performance table TB 1 shown in FIG. 6.

In step S450, the radio communication device 100 determines whether or not the band Rij satisfies a required band Rap required by the application 111.

When the band Rij does not satisfy the required band Rap (NO in step S450), the radio communication device 100 determines in step S460 whether or not a parameter of the application 111 can be adjusted in such a way that the required band Rap becomes equal to or less than the band Rij. When the band is used for a voice call application using VoIP, for example, the radio communication device 100 determines whether or not the communication rate can be changed by changing the method of the codec to be used.

When a parameter of the application 111 can be adjusted in such a way that the required band Rap becomes equal to or less than the band Rij (YES in step 460), the radio communication device 100 adjusts in step S470 the parameter of the application 111 and continues execution of the application 111 (voice call application, for example).

When a parameter of the application 111 cannot be adjusted in such a way that the required band Rap becomes equal to or less than the band Rij (NO in step 460), the radio communication device 100 changes in step S480 the application 111 to another application 111 with which the band Rij satisfies the required band Rap. When a TV phone application is executed, for example, the radio communication device 100 changes the TV phone application to a normal voice call application not including images.

In step S490, the radio communication device 100 changes a transmission distribution algorithm for the packets to be transmitted to the two radio communication networks to another in order that the required band Rap can be secured.

When the expected voltage Vexp is equal to or less than the threshold voltage Vthld (YES in step S430), the radio communication device 100 in step S500 determines whether or not to prioritize battery saving.

When the battery saving is prioritized (YES in step S500), the radio communication device 100 selects in step S510 two radio communication networks for which the drop amounts Vd of the output voltage Vy are large.

Meanwhile, when the battery saving is not prioritized (NO in step S500), the radio communication device 100 selects in step S520 two radio communication networks each having a low throughput.

In step S530, the radio communication device 100 calculates a typical band Ri that can be supported by the remaining one radio communication network.

In step S540, the radio communication device 100 determines whether or not the band Ri satisfies the required band Rap.

When the band Ri does not satisfy the required band Rap (NO in step S540), the radio communication device 100 determines in step S550 whether or not a parameter of the application 111 can be adjusted in such a way that the required band Rap becomes equal to or less than the band Ri.

When a parameter of the application 111 can be adjusted in such a way that the required band Rap becomes equal to or less than the band Ri (YES in step S50), the radio communication device 100 adjusts in step S560 the parameter of the application 111 and continues execution of the application 111.

When a parameter of the application 111 cannot be adjusted in such a way that the required band Rap becomes equal to or less than the band Ri (NO in step S50), the radio communication device 100 changes in step S570 the application 111 to another application 111 with which the band Ri satisfies the required band Rap.

When the radio communication device 100 is not connected to all the radio communication networks 1, 2 and 3 (NO in step S320), in step S580 shown in FIG. 5, the radio communication device 100 determines whether or not the radio communication device 100 is connected to two radio communication networks among the radio communication networks 1, 2 and 3.

When the radio communication device 100 is connected to two radio communication networks (YES in step S580), the radio communication device 100 determines in step S590 whether or not the output voltage Vy is equal to or less than the threshold voltage Vthld.

When the output voltage Vy is equal to or less than the threshold voltage Vthld (YES in step S590), the radio communication device 100 in step S600 determines whether or not to prioritize battery saving.

Meanwhile, when the output voltage Vy is higher than the threshold voltage Vthld, the radio communication device 100 repeats the processing from step S310.

When the battery saving is prioritized (YES in step S600), the radio communication device 100 selects in step S610 a radio communication network having the lowest throughput.

In step S620, the radio communication device 100 calculates an expected voltage Vexp of a case where the radio communication device 100 is connected to the remaining one radio communication network, i.e., the one radio communication network which has not been selected.

In step S630, the radio communication device 100 determines whether or not the output voltage Vy is equal to or less than the threshold voltage Vthld.

When the output voltage Vy is equal to or less than the threshold voltage Vthld (YES in step S630), the radio communication device 100 selects in step S640 a radio communication network for which the drop amount Vd of the output voltage Vy is the largest.

In step S650, the radio communication device 100 calculates a typical band Ri that can be supported by the remaining one radio communication network.

In step S660, the radio communication device 100 determines whether or not the band Ri satisfies the required band Rap.

When the band Ri does not satisfy the required band Rap (NO in step S660), the radio communication device 100 determines in step S670 whether or not a parameter of the application 111 can be adjusted in such a way that the required band Rap becomes equal to or less than the band Ri.

When a parameter of the application 111 can be adjusted in such a way that the required band Rap becomes equal to or less than the band Ri (YES in step 670), the radio communication device 100 adjusts in step S680 the parameter of the application 111 and continues execution of the application 111.

When a parameter of the application 111 cannot be adjusted in such a way that the required band Rap becomes equal to or less than the band Ri (NO in step 670), the radio communication device 100 changes in step S690 the application 111 to another application 111 with which the band Ri satisfies the required band Rap.

(4) Effects and Advantages

According to the radio communication device 100, when an expected voltage Vexp is equal to or less than a threshold voltage Vthld, a fewer number of radio communication networks than the number of radio communication networks to be connected on the basis of a communication request involving connection to radio communication networks are selected, and a network connection unit is connected to the selected radio communication network. Further, the connection radio communication network (candidate radio communication network) is selected in such a way that the expected voltage Vexp exceeds the threshold voltage Vthld.

In addition, when an output voltage Vy is equal to or less than a threshold voltage Vthld, a radio communication network which is connected via a network connection unit and which is to be disconnected is selected, and the connection between the selected radio communication network and the network connection unit is disconnected. Further, the radio communication network to be disconnected is selected in such a way that the output voltage Vy exceeds the threshold voltage Vthld when the network connection unit is disconnected from the radio communication network.

Thus, it is possible to perform desired communications to the utmost extent while avoiding occurrence of a situation where communications cannot be performed due to a drop of the output voltage Vy to a voltage causing a protection circuit to operate.

In this embodiment, when a candidate radio communication network to be connected is selected, a radio communication network is selected in such a way that the expected voltage Vexp becomes the largest. Thus, it is possible to suppress the voltage drop Vd of the output voltage Vy and to further extend a period during which desired communications can be performed.

In this embodiment, when a candidate radio communication network to be connected is selected, a radio communication network is selected in such a way that the throughput becomes the largest. Thus, occurrence of a situation where the required band Rap required by the application 111 can be satisfied increases, and thus occurrence of a situation where the application 111 needs to be changed to another application having a lower required band Rap can be also reduced.

In addition, when a candidate radio communication network to be disconnected is selected, a radio communication network is selected in such a way that the throughput becomes the largest. Thus, the occurrence of a situation where the required band Rap required by the application 111 can be satisfied increases and thus the occurrence of a situation where the application 111 needs to be changed to another application having a lower required band Rap can also be reduced even after the disconnection of the radio communication network.

In this embodiment, when a candidate radio communication network to be disconnected is selected, a radio communication network is selected in such a way that the expected voltage Vexp exceeds the threshold voltage Vthld. Thus, the output voltage Vy after the disconnection of the radio communication network increases, and a period during which desired communications can be performed can be further extended.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the aforementioned embodiment, for example, when a candidate radio communication network to be connected, and when a candidate radio communication network to be disconnected are selected, a radio communication network is selected in such a way that the throughput becomes the largest. It is not always necessary, however, to select a radio communication network in such a way that the throughput becomes the largest. Specifically, when there exist multiple combinations of radio communication networks with which the required band Rap required by the application 111 can be satisfied, any of the combinations may be selected.

In the aforementioned embodiment, when a radio communication network to be disconnected is selected, a radio communication network for which the drop amount Vd of the output voltage Vy is the largest is selected, but it is not always necessary to select a radio communication network for which the drop amount Vd of the output voltage Vy is the largest. Specifically, when there exist multiple combinations of radio communication networks, each of which causes the output voltage Vy to exceed the threshold voltage Vthld, any of the combinations may be selected.

As described above, the present invention naturally includes various embodiments which are not described herein. Accordingly, the technical scope of the present invention should be determined only by the matters to define the invention in the scope of claims regarded as appropriate based on the description.

Note that, the entire contents of Japanese Patent Application No. 2008-048764 (filled on Feb. 28, 2008) are incorporated in this description by reference.

INDUSTRIAL APPLICABILITY

As described above, the radio communication device and the radio communication method according to the present invention are advantageous in radio communications such as mobile communications because they are capable of performing desired communications to the utmost extent even in a case where an output voltage of a battery drops.

The invention claimed is:

1. A radio communication device operating on a battery and connectable to a plurality of radio communication networks, the device comprising:
   a network connection unit configured to connect to each of the radio communication networks by use of radio signals;
   a voltage detector configured to detect an output voltage outputted from the battery;
   a communication request receiver configured to receive a communication request from an application executed in the radio communication device, the communication request involving connection to two or more requested ones of the radio communication networks via the network connection unit;
   a voltage drop amount acquisition unit configured to, for each of the requested radio communication networks, acquire a drop amount of the output voltage corresponding to a connection to the radio communication network; and
   an operation controller configured to
      subtract one or more of the drop amounts from the output voltage to determine one or more expected voltages,
      if at least one of the one or more expected voltages is less than or equal to a predetermined threshold value, select a fewer one or more of the requested radio communication networks for which an expected voltage exceeds the predetermined threshold value, and cause the network connection unit to connect to the selected one or more radio communication networks.

2. The radio communication device according to claim 1, wherein the operation controller selects a fewer one or more of the requested radio communication networks for which the expected voltage exceeds the predetermined threshold value and is maximized.

3. The radio communication device according to claim 1, further comprising a throughput acquisition unit configured to, for each of the requested radio communication networks, acquire a throughput of data transmitted and received via the radio communication network, wherein the operation controller selects a fewer one or more of the requested radio communication networks for which the expected voltage exceeds the predetermined threshold value and a throughput is maximized.

4. The radio communication device according to claim 3, wherein the throughput acquisition unit acquires the throughput on the basis of a network performance table in which the radio communication networks and the throughputs are associated with each other.

5. The radio communication device according to claim 3, wherein the operation controller is further configured to:
   determine a communication rate that can be supported by the selected one or more radio communication networks; and
   determine whether the communication rate satisfies a communication rate required by the application.

6. The radio communication device according to claim 5, wherein the operation controller is further configured to, if it is determined that the supportable communication rate does not satisfy the required communication rate, adjust a parameter of the application such that the required communication rate becomes equal to or less than the supportable communication rate.

7. The radio communication device according to claim 5, wherein the operation controller is further configured to, if it is determined that the supportable application to a different application.

8. The radio communication device according to claim 1, wherein the voltage drop amount acquisition unit acquires the drop amount on the basis of a voltage drop amount table in which the radio communication networks and the voltage drop amounts are associated with each other.

9. The radio communication device according to claim 1, wherein the operation controller is configured to sum two or more of the drop amounts and subtract the sum from the output voltage to determine an expected voltage.

10. The radio communication device according to claim 1, wherein the requested radio communication networks comprise a first radio communication network, a second radio communication network, and a third radio communication network, and wherein the operation controller is configured to:
    subtract a first drop amount associated with the first radio communication network and a second drop amount associated with the second radio communication network from the output voltage to determine a first expected voltage;
    subtract the first drop amount and a third drop amount associated with the third radio communication network from the output voltage to determine a second expected voltage;
    subtract the second drop amount and the third drop amount from the output voltage to determine a third expected voltage; and
    compare each of the first expected voltage, the second expected voltage, and the third expected voltage to the predetermined threshold value.

11. The radio communication device according to claim 10, wherein the operation controller is configured to select two of the first radio communication network, the second radio communication network, and the third radio communication network, corresponding to a highest one of the first expected voltage, the second expected voltage, and the third expected voltage.

12. A radio communication method used in a radio communication device operating on a battery and including a network connection unit connectable to a plurality of radio communication networks by use of radio signals, the method comprising the steps of:
    detecting an output voltage outputted from the battery;
    receiving a communication request from an application executed in the radio communication device, the communication request involving connection to two or more requested ones of the radio communication networks via the network connection unit;

for each of the requested radio communication networks, acquiring a drop amount of the output voltage corresponding to a connection to the radio communication network;

subtracting one or more of the drop amounts from the output voltage to determine one or more expected voltages;

if at least one of the one or more expected voltages is less than or equal to a predetermined threshold value, selecting a fewer one or more of the requested radio communication networks for which an expected voltage exceeds the predetermined threshold value; and causing the network connection unit to connect to the selected one or more radio communication networks.

13. The radio communication method according to claim 5, further comprising:

determining a communication rate that can be supported by the selected one or more radio communication networks;

determining whether the communication rate satisfies a communication rate required by the application; and if it is determined that the supportable communication rate does not satisfy the required communication rate, changing the application to a different application.

14. A radio communication device operating on a battery and connectable to a plurality of radio communication networks, the device comprising:

a network connection unit configured to connect to each of the radio communication networks by use of a radio signal;

a voltage detector configured to detect an output voltage outputted from the battery in a state where the network connection unit is connected to each of the radio communication networks;

a voltage drop amount acquisition unit configured to, for each of the connected radio communication networks, acquire a drop amount of the output voltage corresponding to a connection to the radio communication network; and an operation controller configured to add one or more of the drop amounts to the output voltage to determine one or more expected voltages in a case where the output voltage is equal to or less than a predetermined threshold value, compare the one or more expected voltages to the predetermined threshold value, based on the comparison, select one or more of the connected radio communication networks for disconnection such that an expected voltage after disconnection would exceed the predetermined threshold value, and cause the network connection unit to disconnect the selected one or more radio communication networks.

15. The radio communication device according to claim 14, wherein the operation controller selects the one or more of the connected radio communication networks corresponding to a largest drop amount.

16. The radio communication device according to claim 14, further comprising a throughput acquisition unit configured to, for each of the connected radio communication networks, acquire a throughput of data to be transmitted and received via the radio communication network, wherein the operation controller selects the one or more connected radio communication networks for disconnection such that the expected voltage after disconnection would exceed the predetermined threshold value and the throughput would be maximized.

17. The radio communication device according to claim 16, wherein the throughput acquisition unit acquires the throughput on the basis of a network performance table in which the radio communication networks and the throughputs are associated with each other.

18. The radio communication device according to claim 14, wherein the voltage drop amount acquisition unit acquires the drop amount on the basis of a voltage drop amount table in which the radio communication networks and the voltage drop amounts are associated with each other.

19. The radio communication device according to claim 14, wherein the operation controller is configured to sum two or more of the drop amounts and subtract the sum from the output voltage to determine an expected voltage.

20. A radio communication method used in a radio communication device operating on a battery and including a network connection unit connectable to a plurality of radio communication networks by use of radio signals, the method comprising the steps of:

detecting an output voltage outputted from the battery in a state where the network connection unit is connected to each the radio communication networks;

for each of the connected radio communication networks, acquiring a drop amount of the output voltage corresponding to a connection to the radio communication network;

subtracting one or more of the drop amounts from the output voltage to determine one or more expected voltages;

comparing the one or more expected voltages to a predetermined threshold value;

based on the comparison, selecting one or more of the connected radio communication networks for disconnection such that an expected voltage after disconnection would exceed the predetermined threshold value; and causing the network connection unit to disconnect the selected one or more radio communication networks.

* * * * *